US012689094B2

(12) United States Patent
    Cao et al.

(10) Patent No.: US 12,689,094 B2
(45) Date of Patent: **\*Jul. 21, 2026**

(54) BATTERY DIAPHRAGM AND LITHIUM BATTERY PREPARED THEREFROM

(71) Applicant: SHANGHAI ENERGY NEW MATERIALS TECHNOLOGY CO., LTD., Shanghai (CN)

(72) Inventors: Dawei Cao, Shanghai (CN); Yongle Chen, Shanghai (CN); Zhi Zhuang, Shanghai (CN); Qian Cheng, Shanghai (CN)

(73) Assignee: SHANGHAI ENERGY NEW MATERIALS TECHNOLOGY CO., LTD., Shanghai (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 19/001,803

(22) Filed: Dec. 26, 2024

(65) Prior Publication Data

US 2025/0253414 A1 Aug. 7, 2025

Related U.S. Application Data

(63) Continuation of application No. PCT/CN2024/084313, filed on Mar. 28, 2024.

(30) Foreign Application Priority Data

Feb. 1, 2024 (CN) .......................... 202410141531.6

(51) Int. Cl.
    *H01M 50/426* (2021.01)
    *C09J 127/16* (2006.01)
    (Continued)

(52) U.S. Cl.
    CPC ......... *H01M 50/426* (2021.01); *C09J 127/16* (2013.01); *H01M 10/052* (2013.01);
    (Continued)

(58) Field of Classification Search
    None
    See application file for complete search history.

(56) References Cited

U.S. PATENT DOCUMENTS

2017/0098809 A1\* 4/2017 Ogata ..................... C08J 7/0427
2020/0266407 A1\* 8/2020 Honda .............. H01M 10/0525
(Continued)

FOREIGN PATENT DOCUMENTS

CN        108352484 A        7/2018
CN        111357133 A        6/2020
          (Continued)

OTHER PUBLICATIONS

International Search Report of PCT/CN2024/084313, Oct. 9, 2024.
(Continued)

*Primary Examiner* — Jonathan Crepeau
(74) *Attorney, Agent, or Firm* — Troutman Pepper Locke LLP; Tim Tingkang Xia, Esq.

(57) ABSTRACT

The present application provides a battery diaphragm, including: a porous substrate and an adhesive layer formed on the side of the porous substrate. The adhesive layer includes a polymer material with an adhesive property. The adhesive layer has a coating coefficient C. The coating coefficient C is equal to a ratio of the adhesive strength A of the adhesive layer to a value P of an increase in gas permeability per unit coating thickness of the adhesive layer. A relation C=A/P is satisfied. The coating coefficient C has a ratio in a range of 0.3<C<1. The adhesive strength A of the adhesive layer has a unit of N/m. The value P of the increase (Continued)

in the gas permeability per unit coating thickness of the adhesive layer has a unit of s/100 cc/μm.

14 Claims, 3 Drawing Sheets

(51) Int. Cl.

| | |
|---|---|
| *H01M 10/052* | (2010.01) |
| *H01M 50/434* | (2021.01) |
| *H01M 50/443* | (2021.01) |
| *H01M 50/446* | (2021.01) |
| *H01M 50/449* | (2021.01) |
| *H01M 50/46* | (2021.01) |
| *H01M 50/489* | (2021.01) |

(52) U.S. Cl.
CPC ....... *H01M 50/434* (2021.01); *H01M 50/443* (2021.01); *H01M 50/446* (2021.01); *H01M 50/449* (2021.01); *H01M 50/461* (2021.01); *H01M 50/489* (2021.01); *C09J 2203/33* (2013.01); *C09J 2301/16* (2020.08); *C09J 2427/00* (2013.01)

(56) References Cited

U.S. PATENT DOCUMENTS

2022/0336924 A1* 10/2022 Kim .................... H01M 50/434

2023/0246297 A1* 8/2023 Bai ..................... H01M 50/426
429/246

FOREIGN PATENT DOCUMENTS

| | | |
|---|---|---|
| CN | 111492504 A | 8/2020 |
| CN | 111599971 A | 8/2020 |
| CN | 114006127 A | 2/2022 |
| CN | 114094283 A | 2/2022 |
| CN | 114361710 A | 4/2022 |
| CN | 115207566 A | 10/2022 |
| CN | 116435711 A | 7/2023 |
| KR | 20210046573 A | 4/2021 |
| KR | 20210052336 A | 5/2021 |
| KR | 20220070098 A | 5/2022 |
| WO | 2017082258 A1 | 5/2017 |
| WO | 2019192475 A1 | 10/2019 |
| WO | 2021075925 A1 | 4/2021 |
| WO | 2023286876 A1 | 1/2023 |

OTHER PUBLICATIONS

China Patent Office "Office Action", Jul. 4, 2025, China.
Korea Patent Office "Office Action", Jul. 1, 2025, Korea.
European Patent Office, "Office Action", Aug. 25, 2025, Germany.
Japan Patent Office "Office Action", Sep. 4, 2025, Japan.
Korea Patent Office, "Office Action", Oct. 21, 2025.

* cited by examiner

BATTERY DIAPHRAGM AND LITHIUM BATTERY PREPARED THEREFROM

CROSS-REFERENCE TO RELATED PATENT APPLICATION

This application is a continuation application of International Application No. PCT/CN2024/084313, filed on Mar. 28, 2024, which itself claims priority to Chinese Patent Application No. 202410141531.6, filed on Feb. 1, 2024. The disclosure of each of the above-mentioned applications is hereby incorporated by reference.

TECHNICAL FIELD

The present application relates to the technical field of a secondary battery material, and particularly to a lithium-ion battery diaphragm and a lithium battery prepared therefrom.

BACKGROUND

A lithium-ion battery is a secondary battery, which not only can convert electrical energy into chemical energy and store the energy, but also can convert the chemical energy into the electrical energy and provide the electrical energy to an electrical device. The lithium-ion battery is widely used due to a high energy density and a long cycle life. Time into the 21st century, with the popularization of a laptop computer, a smart phone, and an electric automobile, the lithium-ion battery is used more widely.

A diaphragm, as an important component of the lithium-ion battery, is basically required to have high ionic conductivity and low electronic conductivity. A currently commonly used lithium battery diaphragm is a porous material prepared by unidirectional or bidirectional stretching of a polyene material. The material has good ionic conduction capacity, an excellent mechanical property, and electrolyte resistance.

Due to the low melting point of polyolefin, the material has poorer heat resistance. Therefore, it is generally necessary to apply a layer of ceramic coating on the material to improve the heat resistance thereof. However, at present, although the ceramic coating can improve the heat shrinkage resistance of the diaphragm, an adhesive property between the ceramic coating and the diaphragm is poor, resulting in the ceramic coating being susceptible to peeling off from the diaphragm. Therefore, how to improve the adhesive strength of the coating is a key problem to be solved.

SUMMARY

Accordingly, a main objective of the present application is to provide a battery diaphragm and a lithium battery prepared therefrom to further optimize the above problems.

To solve the above technical problems, an objective of the present application is to provide a battery diaphragm, including: a porous substrate or a composite material consisting of the porous substrate and a heat-resistant layer positioned on the porous substrate; and an adhesive layer formed on the porous substrate or the composite material. The adhesive layer includes a polymer material with an adhesive property. The adhesive layer has a coating coefficient C. The coating coefficient C is equal to a ratio of the adhesive strength A of the adhesive layer to a value P of an increase in gas permeability per unit coating thickness of the adhesive layer. A relation C=A/P is satisfied. The coating coefficient C has a ratio in a range of 0.3<C<1. The adhesive strength A of the adhesive layer has a unit of N/m. The value P of the increase in the gas permeability per unit coating thickness of the adhesive layer has a unit of s/100 cc/μm.

For the battery diaphragm as described above, the adhesive layer includes an adhesive polymer material or a mixture of the adhesive polymer material and a filler. The filler includes an organic high-temperature resistant material or an inorganic high-temperature resistant material.

For the battery diaphragm as described above, the adhesive polymer material includes a polyvinylidene fluoride homopolymer, a polyvinylidene fluoride copolymer, a methyl methacrylate homopolymer, a methyl methacrylate copolymer, or a mixture thereof.

For the battery diaphragm as described above, a vinylidene fluoride monomer in the polyvinylidene fluoride copolymer has a mole ratio greater than 50%, and other comonomers may be one or more of hexafluoropropylene, tetrafluoroethylene, trifluoroethylene, trichloroethylene, acrylic acid, methacrylic acid, metacrylic acid ester and vinyl acetate.

For the battery diaphragm as described above, the adhesive layer may be positioned on the single side of the porous substrate, the two sides of the porous substrate, the single side of the composite material or the two sides of the composite material.

For the battery diaphragm as described above, the heat-resistant layer includes a ceramic material, a heat-resistant polymer material or a mixture of the ceramic material and the heat-resistant polymer material.

Another objective of the present application is to provide a battery diaphragm, including a porous substrate, and an adhesive layer formed on the side of the porous substrate. The adhesive layer includes a polymer material with an adhesive property. The polymer material includes polyvinylidene fluoride (PVDF). The adhesive layer has a coating coefficient C. The coating coefficient C is equal to a ratio of the adhesive strength A of the adhesive layer to a value P of an increase in gas permeability per unit coating thickness of the adhesive layer. A relation C=A/P is satisfied. The coating coefficient C has a ratio in a range of 0.4<C<0.9. The adhesive strength A of the adhesive layer has a unit of N/m. The value P of the increase in the gas permeability per unit coating thickness of the adhesive layer has a unit of s/100 cc/μm.

For the battery diaphragm as described above, a raw material of a polyvinylidene fluoride copolymer has a crystallinity in a range of 10%-50%.

For the battery diaphragm as described above, the adhesive layer is coated with aqueous polyvinylidene fluoride. An α-phase in a crystalline region of the aqueous polyvinylidene fluoride has a ratio greater than 30% and less than 70%.

For the battery diaphragm as described above, the adhesive layer is coated with oil-based polyvinylidene fluoride. An α-phase in a crystalline region of the oil-based polyvinylidene fluoride utilized by the adhesive layer has a ratio less than 20%.

Another objective of the present application is to provide a lithium battery, including a positive electrode, a negative electrode and a battery diaphragm as described above. The battery diaphragm is positioned between the positive electrode and the negative electrode.

The present application improves the adhesive property between the diaphragm and an electrode sheet by introducing an adhesive polymer material into a diaphragm coating. In addition, a heat-resistant polymer material such as aramid is introduced into the diaphragm coating, which can increase a diaphragm-breaking temperature of the diaphragm. Further, ceramic is introduced into the diaphragm coating to improve the heat shrinkage resistance of the diaphragm. The above improvement means can effectively solve the problem that the ceramic coating is prone to peeling off from the diaphragm due to insufficient adhesive strength. In addition, for the present application, a value of the coating coefficient C is designed to indicate the adhesive property and the gas permeability of the coating and limit the value to a certain better range, so that it can be very convenient to evaluate whether and ensure that the adhesive property and the gas permeability of the diaphragm meet requirements.

DETAILED DESCRIPTION OF EMBODIMENTS

Figure 1:
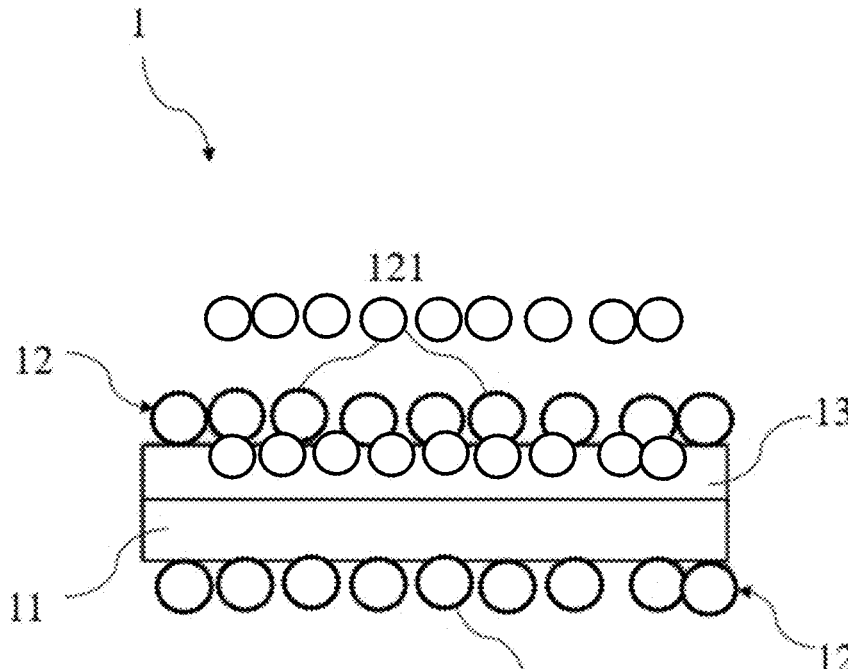
FIG. 1 shows a schematic structural sectional diagram of a battery diaphragm according to an embodiment of the present application.

Each of the following embodiments is described with reference to the accompanying drawings to exemplify particular embodiments in which the present application may be implemented. Directional terms such as "up", "down", "front", "back", "left", "right", "inside", "outside", "side", and the like mentioned in the present application are only directions with reference to the accompanying drawings. Accordingly, the directional terms used are intended to illustrate and understand the present application and are not intended to limit the application.

The accompanying drawings and description are considered to be illustrative in nature and not limiting. In the drawings, structurally similar units are indicated by the same reference signs. Further, the dimensions and thickness of each assembly illustrated in the accompanying drawings are arbitrarily shown for the sake of understanding and ease of description, but the present application is not limited thereto.

In the accompanying drawings, the thicknesses of the layers, membranes, regions, and the like are exaggerated for the sake of clarity. In the accompanying drawings, the thicknesses of some of layers and regions are exaggerated for understanding and ease of description. It will be understood that when an assembly such as a layer, a diaphragm, a region or a substrate is "on" another assembly, the assembly can be directly on the another assembly, or there can be an intermediate assembly.

Further, in the specification, the word "including" will be understood to mean including the assembly, but not excluding any other assembly, unless explicitly described to the contrary. Further, in the specification, the word "on . . . " means being positioned above or below a target assembly and does not mean being positioned on a top based on the direction of gravity.

To further describe the technical means and efficacy adopted in the present application for achieving an intended inventive purpose, a specific embodiment, a structure, a feature, and efficacy of a battery diaphragm and a proton exchange diaphragm sheet prepared therefrom according to the present application are proposed hereinafter in detail in connection with the accompanying drawings and the specific embodiment.

Figure 3:
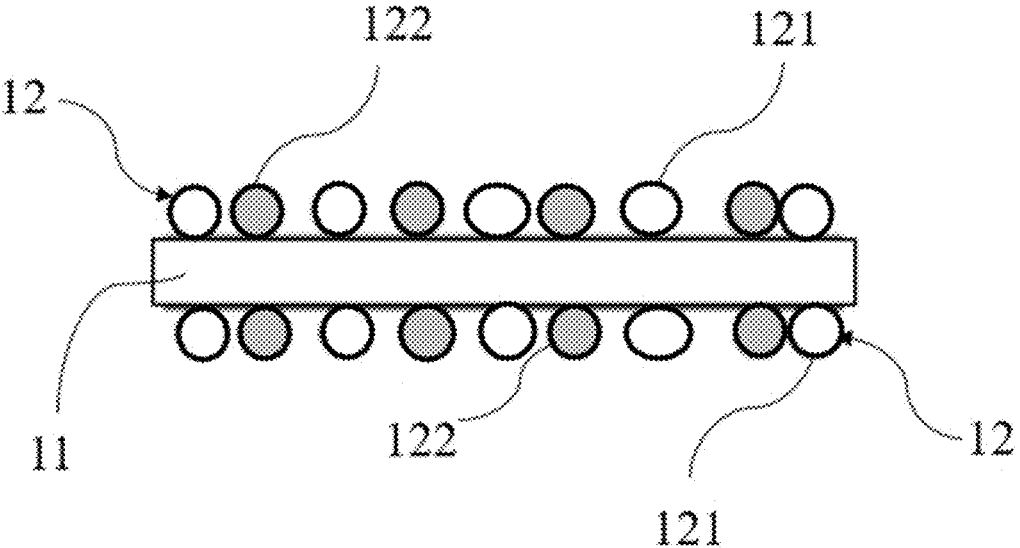
FIG. 3 shows a schematic structural sectional diagram of a battery diaphragm according to yet another embodiment of the present application.

Please also refer to FIG. 1, a battery diaphragm 1 of one embodiment of the present application includes: a porous substrate 11; a heat-resistant layer 13 positioned on a side of the porous substrate 11, where the porous substrate 11 and the heat-resistant layer 13 together form a composite material; and an adhesive layer 12, formed on the composite material. Alternatively, as shown in FIG. 3, a structure of the heat-resistant layer 13 is omitted, leaving only the porous substrate 11. The adhesive layer 12 is formed directly on a side of the porous substrate 11. Regardless of whether the adhesive layer 12 is formed on the porous substrate 11 or the composite material, the adhesive layer 12 includes an aggregation layer formed by a polymer material 121 with an adhesive property. The adhesive layer 12 has a coating coefficient C. The coating coefficient C is equal to a ratio of the adhesive strength A of the adhesive layer 12 to a value P of an increase in gas permeability per unit coating thickness of the adhesive layer. A relation $C=A/P$ is satisfied. The coating coefficient C has a ratio in a range of $0.3<C<1$. The adhesive strength A of the adhesive layer 12 has a unit of N/m. The value P of the increase in the gas permeability per unit coating thickness of the adhesive layer 12 has a unit of $s/100 \ cc/\mu m$.

In this embodiment, the porous substrate 11 refers to a material having voids or pores inside the substrate, which can be a porous sheet formed from a fibrous material such as a nonwoven fabric and a paper-like sheet; or a composite porous sheet obtained by stacking more than one other porous layers on these micro-porous membranes, the porous sheet, and the like. The porous substrate may also be a polyolefin material having a porous structure obtained by unidirectional or multidirectional stretching followed by a dry or wet method, or a porous material obtained by a method such as non-solvent-induced phase separation, thermally-induced phase separation and steam-induced phase separation. The polyolefin material generally refers to polyethylene and polypropylene. The porous substrate 11 may also be prepared by a method such as electrostatic spinning. The material of the substrate may be obtained by one or more of fibers of materials such as polyethylene terephthalate, nylon, aramid, polysulfone, polyether ether ketone, and polyimide. The porous substrate 11 has generally a thickness in a range of 3-30 μm. The porous substrate 11 has a value of gas permeability in a range of 30-500 s/100 ml.

In this embodiment, the adhesive layer 12 may be disposed on the two sides of the composite material. Each side of the composite material has a surface density in a range of $0.1-6.0 \ g/m^2$, but is not limited thereto. The adhesive layer 12 may also be disposed on only the single side of the composite material or the single side or the two sides of the porous substrate 11. In this embodiment, the adhesive layer 12 includes an aggregation layer formed by the aggregation of the polymer material 121 with the adhesive property, such as polyvinylidene fluoride (PVDF) particles or acrylic particles, but is not limited to these particulate forms. The polymer material 121 with the adhesive property may be fibrous, or reticulated, or cross-linked.

The polymer material 121 with the adhesive property may refer to a polyvinylidene fluoride-type polymer material or a polyacrylate-type polymer material. A polyacrylate-type resin is copolymerized by methyl methacrylate (PMMA), acrylic acid, methacrylic acid, ethyl methacrylate, styrene, butyl methacrylate, methacrylamide, isobutylene, acrylonitrile, and other materials, and may also be polymerized by a variety of methacrylate, acrylic acid, acrylate, styrene, ethylene glycol, acrylonitrile, and other monomers. The resin may also be obtained after a cross-linking reaction. The resin may also be a material with a core-shell structure, that is, materials of a core layer and a shell layer are different. Thus, in some embodiments, the adhesive layer 12 includes the adhesive polymer material. The adhesive polymer material includes a polyvinylidene fluoride homopolymer, a polyvinylidene fluoride copolymer, a methyl methacrylate homopolymer, a methyl methacrylate copolymer, or a mixture thereof.

In this embodiment, the polyvinylidene fluoride (PVDF)-type resin is a fluorine-containing polymer material in which a monomer of polyvinylidene fluoride is a main body. The polyvinylidene fluoride (PVDF)-type resin may be homopolymerized polyvinylidene fluoride or copolymerized polyvinylidene fluoride, such as a copolymer of vinylidene fluoride and tetrafluoroethylene, a copolymer of vinylidene fluoride and hexafluoropropylene, a copolymer of vinylidene fluoride and trifluoroethylene, a mixture of a polyvinylidenfluorid polymer and an acrylic acid polymer, and a polyvinylidene fluoride copolymer. A comonomer may be selected from hexafluoropropylene, tetrafluoroethylene, trifluoroethylene, trichloroethylene, acrylic acid, methacrylic acid, methacrylate, vinyl acetate, and other monomers.

In some embodiments, the adhesive layer 12 includes the adhesive polymer material or a mixture of the adhesive polymer material and a filler. The filler includes an organic high-temperature resistant material or an inorganic high-temperature resistant material. The inorganic high-temperature resistant material includes a ceramic material such as alumina, boehmite, barium sulfate, magnesium hydroxide, and barium titanate. The organic high-temperature resistant material includes a polyimide microsphere, crosslinked-type polyacrylic acid, crosslinked-type acrylic ester, crosslinked-type polymethacrylic acid (ester), crosslinked polystyrene, crosslinked polysiloxane, polysulfone, polyacrylonitrile, and the like.

In this embodiment, the value P of the increase in the gas permeability per unit coating thickness of the adhesive layer 12, i.e., a ratio of a difference between a value of the gas permeability of the adhesive layer 12 and a value of gas permeability of the porous substrate 11 to a thickness of the adhesive layer, is in a range of 0-50 s/100 cc/μm, more preferably in a range of 0-30s/100 cc/μm, and further preferably in a range of 0-15s/100 cc/μm. The "gas permeability per unit coating thickness" is a value obtained by dividing the difference between the gas permeability of the adhesive layer 12 and the gas permeability of the porous substrate 11 by the thickness of the adhesive layer 12. The gas permeability has a unit of "s/100 cc", and the thickness of the adhesive layer 12 has a unit of "μm". In this embodiment, the adhesive layer 12 includes a polymer resin material or a mixture of a polymer resin and a ceramic material. The surface of the adhesive layer 12 has a smoothness of 1.30 or less.

In some embodiments, an oil-based adhesive coating tends to have a better adhesive strength but poorer gas permeability due to a higher coverage area compared to an aqueous adhesive coating. The higher the adhesive strength, the tighter the bonding between the diaphragm and an electrode sheet, which can greatly improve the volumetric energy density of the diaphragm. Since a gas is generated during a charge/discharge cycle, the presence of the gas between the diaphragm and the electrode sheet leads to poor ionic conductivity. Therefore, the cycle life of a battery is also shortened. This problem can be avoided by the presence of the adhesive layer. However, the presence of the adhesive layer leads to a decrease in the gas permeability and reduces ionic conduction capability, so it is necessary to control the adhesive strength and the gas permeability of the diaphragm at the same time to optimize the overall property of the diaphragm. Therefore, the above adhesive layer 12 has a ratio of the coating coefficient C in a range of 0.3<C<1. Such a parameter limitation may allow the battery diaphragm 1 of the present application to achieve the optimal design of the adhesive strength and the gas permeability.

In this embodiment, the above adhesive layer 12 has a ratio of the coating coefficient C in a range of about 0.3<C<1, but is not limited thereto. In some embodiments, the ratio of the coating coefficient C may also preferably be in a range of 0.5<C<1, 0.3<C<0.8, or 0.4<C<0.9. For example, in another embodiment of the present application, the battery diaphragm has a structure similar to that of FIG. 3 and includes the porous substrate and the adhesive layer positioned on the side of the porous substrate. The adhesive layer includes a polymer material with the adhesive property. The polymer material includes polyvinylidene fluoride (PVDF). The adhesive layer has the coating coefficient C. The coating coefficient C is equal to the ratio of the adhesive strength A of the adhesive layer to the value P of the increase in the gas permeability per unit coating thickness of the adhesive layer. The relation C-A/P is satisfied. The ratio of the coating coefficient C is in a range of 0.4<C<0.9. The adhesive strength A of the adhesive layer has the unit of N/m. The value P of the increase in the gas permeability per unit coating thickness of the adhesive layer has the unit of s/100 cc/μm.

For a copolymerized polymer of the above polyvinylidene fluoride (PVDF), the PVDF monomer has a mole ratio higher than 50%. A raw material of the copolymerized polymer of the above PVDF has a crystallinity in a range of 10%-50%. An α-phase in a crystalline region of PVDF in a PVDF coating of an aqueous PVDF coated diaphragm has a ratio greater than 30% and less than 70%. An α-phase in a crystalline region of PVDF in a PVDF coating of an oil-based PVDF coated diaphragm has a ratio less than 20%. For the design of the mole ratio, a crystallinity range of the raw material and the ratio of the α-phase in the crystalline region are designed to have a practical effect on the ratio of the coating coefficient C, so as to limit the range of the ratio of the coating coefficient C to 0.4<C<0.9.

Referring to FIG. 1, in this embodiment, the heat-resistant layer 13 includes a ceramic material and a heat-resistant polymer material or is a mixture of the ceramic material and the heat-resistant polymer material. The ceramic material is selected from at least one of a metal hydroxide, a metal oxide, and a metal-containing salt. The ceramic material includes, but is not limited to, particles of an inorganic material such as alumina, burmite, magnesium hydroxide, barium titanate, and barium sulphate. The heat-resistant polymer material includes, but is not limited to, meta-aramid, para-aramid, polyimide (including homobenzene-type polyimide, soluble polyimide, polyetherimide and polyamide imide), polyethersulfone, polyetherether ketone, polyethylene glycol protodicarboxylate, and other polymer materials. These polymer materials have a glass transition temperature of 200° C. or more and a thermal decomposition temperature of 400° C. or more. The heat-resistant polymer material may be granular, fibrous, reticulated, or cross-linked-type polymer microsphere particles.

Figure 2:
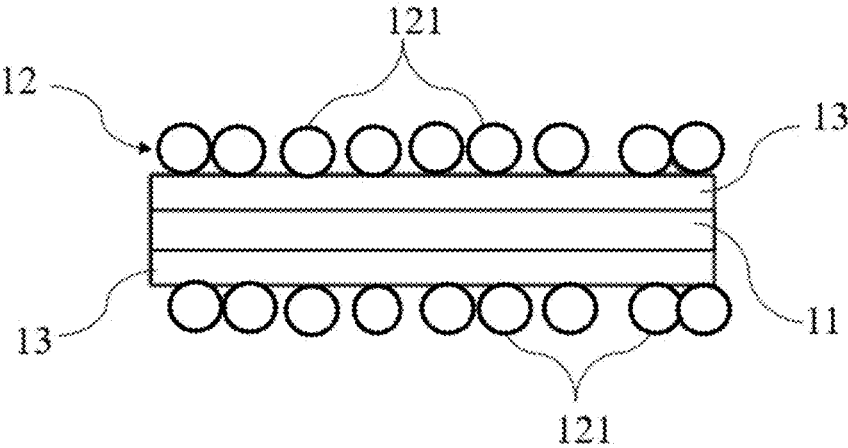
FIG. 2 shows a schematic structural sectional diagram of a battery diaphragm according to another embodiment of the present application.
Figure 4:
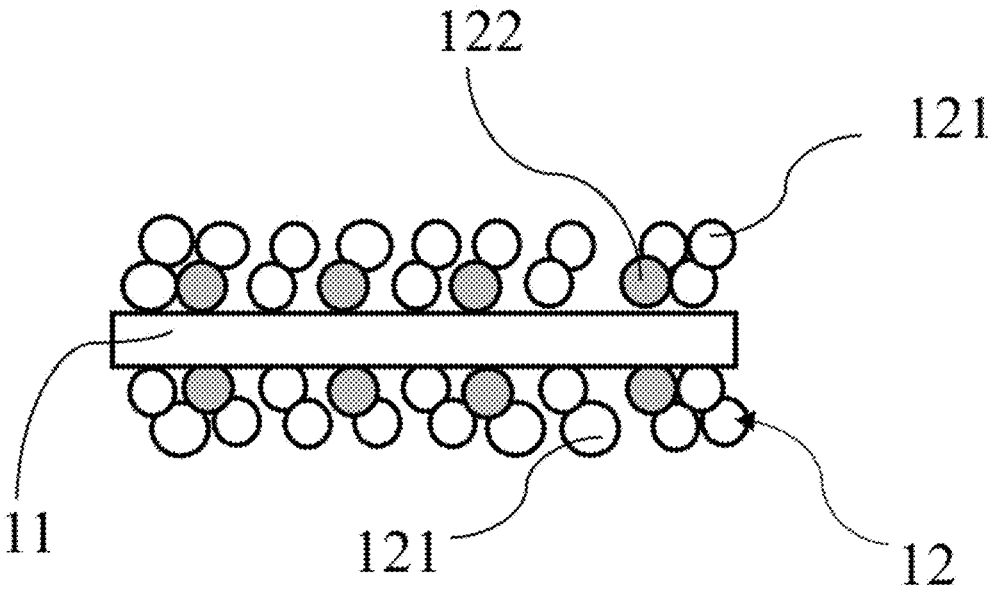
FIG. 4 shows a schematic structural sectional diagram of a battery diaphragm according to a further embodiment of the present application.

In this embodiment, only one heat-resistant layer 13 is positioned on the single side of the porous substrate 11. However, without being limited thereto, referring to FIG. 2, the heat-resistant layer 13 may also be positioned on the two sides of the porous substrate 11. The heat-resistant layer 13 includes an aramid polymer and an inorganic filler. The adhesive layer 12 includes particles of polyvinylidene fluoride (PVDF) and/or acrylic particles formed by the polymer material 121 with the adhesive property. In some embodiments, referring to FIG. 3, the adhesive layer 12 includes, in addition to the polymer material 121 with the adhesive property, particles 122 of the ceramic material. Therefore, the adhesive layer 12 is a particle aggregation layer formed by aggregation of the particles of the polymer material 121 and the particles 122 of the ceramic material. In other embodiments, referring to FIG. 4, the polymer material 121 may be continuously coated on the adhesive layer 12 on one side of the porous substrate 11 described in FIG. 3, so that the polymer material 121 is capable of covering particles 122 of the ceramic material, thereby improving an adhesive property and increasing a thickness of the entire adhesive layer 12.

In some embodiments, a lithium battery of an embodiment of the present application includes a positive electrode, a negative electrode, and a battery diaphragm 1 as described above. The battery diaphragm 1 is positioned between the positive electrode and the negative electrode. Electric potential is obtained by the embedding and disembedding of lithium ions. The positive electrode includes a positive active material, a conductive agent, a binder, a current collector and other materials. The conductive agent can be enumerated as a material such as acetylene black, Ketjen black, and a graphite powder. The negative electrode includes a material that can receive the lithium ions, such as a carbon material, silicon, aluminum, and other materials alloyed with lithium. An electrolyte is a solution obtained by dissolving a lithium salt in a non-aqueous solvent. The lithium salt may be a material such as $LiPF_6$, $LiBF_4$, $LiClO_4$, LiTFSI and LiFSI. As the non-aqueous solvent, for example, a cyclic carbonate ester such as ethylene carbonate, propylene carbonate, ethyl fluorocarbonate and ethyl difluorocarbonate, chain carbonate ester such as dimethyl carbonate, diethyl carbonate, methyl ethyl carbonate and fluoro-substituents thereof, as well as cyclic ester such as γ-butyrolactone and γ-valerolactone may be enumerated and used individually or in a mixture. As an external encapsulation material, a metal shell and an aluminum laminated film packaging may be enumerated. The battery can be square, cylindrical and button-shaped. The battery diaphragm 1 of the present application is suitable for any of these shapes. Considering from the viewpoint of ion permeability, the battery diaphragm 1 of the present application has preferably a value of gas permeability of 300 s/100 ml or less, has preferably a thickness of 30 μm or less, has preferably an electrical resistance of 0.5-10 ohm·cm², and has preferably a puncture strength in a range of 10-1200 gf, preferably in a range of 200-800 gf.

A method for manufacturing the diaphragm for a non-aqueous secondary battery is a method for manufacturing the diaphragm for the non-aqueous secondary battery having the above amount of a particle-containing coating of an aggregate, a filler, and a heat-resistant polymer on the one side or two sides of the porous substrate. A coating process of the method includes an aqueous coating process and an oil-based coating process. The aqueous coating process includes: (1) adding a wetting agent, a dispersant, a thickener, the filler, a polymer material with an adhesive property, a binder and so on in a certain order, and mixing and stirring to obtain a uniform slurry; (2) coating the slurry on the diaphragm by using wire rod coating, roller coating and other methods; and (3) placing the diaphragm into an oven to obtain an aqueous slurry coating after drying. The oil-based coating process includes: (1) dissolving the polymer material and the heat-resistant polymer material in a suitable solvent to obtain a homogeneous solution, or mixing the solution with ceramic particles, heat-resistant polymer particles, a heat-resistant polymer fiber and the like to obtain a homogeneous dispersion liquid; (2) coating the solution or the dispersion liquid on a base film, producing pores using one of methods such as a method of non-solvent-induced phase separation, or placing the solution or the dispersion liquid directly into the oven by a method of steam-induced phase separation; (3) washing the solution or the dispersion liquid with water to wash off a solvent; and (4) placing a product into the oven and drying.

In some embodiments, an aqueous dispersion is made by dispersing, suspending, or emulsifying polymer particles with an adhesive property and a filler including at least one of an organic compound and an inorganic compound, respectively, in a solid state in the solvent. The aqueous dispersion can be an emulsion liquid or a suspension liquid. During the preparation of the coated diaphragm, water in the aqueous slurry needs to be evaporated to obtain a dry coating. For an oil-based coating solution, the diaphragm also needs to be dried to remove water as the solvent needs to be washed off with water.

An objective of the present application and the solution of the technical problems are realized by using the following technical solutions.

Figure 5:
FIG. 5 shows a flowchart of a method for preparing and processing a battery diaphragm according to an embodiment of the present application.
Figure 5:
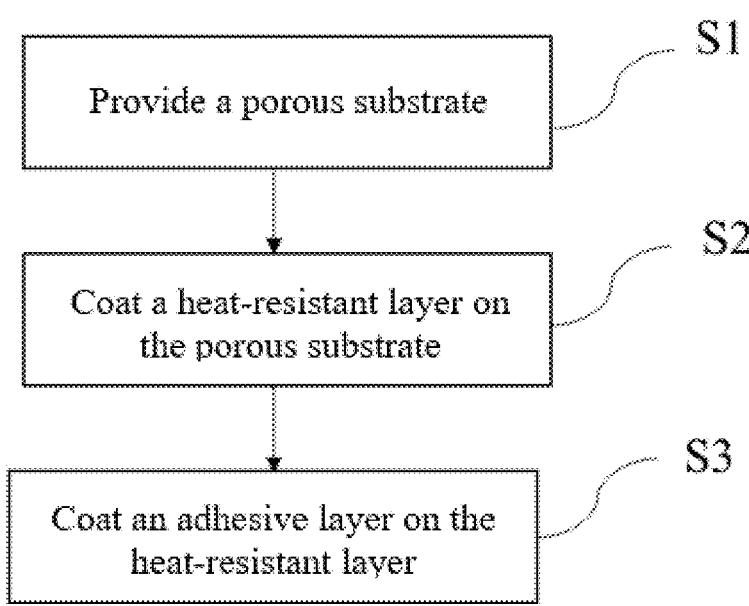

The present application provides a method 2 for preparing and processing a battery diaphragm. Please refer to FIG. 1 and FIG. 5 at the same time, the method includes the following steps: step S1: providing a porous substrate; step S2: coating a heat-resistant layer on a side of the porous substrate, and step S3: coating an adhesive layer on the heat-resistant layer. The adhesive layer includes an aggregation layer formed by aggregation of a polymer material with an adhesive property. The adhesive layer has a coating coefficient C. The coating coefficient C is equal to a ratio of the adhesive strength A of the adhesive layer to a value P of an increase in gas permeability per unit coating thickness of the adhesive layer. A relation C=A/P is satisfied. The coating coefficient C has a ratio in a range of 0.3<C<1. The adhesive strength A of the adhesive layer has a unit of N/m. The value P of the increase in the gas permeability per unit coating thickness of the adhesive layer has a unit of s/100 cc/μm. It is to be understood that a structure of the battery diaphragm obtained by the method 2 for preparing and processing the battery diaphragm includes the porous substrate, the heat-resistant layer formed on the porous substrate, and the adhesive layer formed on the heat-resistant layer. However, without being limited thereto, when a customer does not need the heat-resistant layer, step S2 may be omitted and step S3 may be carried out directly. The obtained structure of the battery diaphragm includes the porous substrate and the adhesive layer formed on the porous substrate.

For the present application, some parameters are designed for experiments. An experimental process and results are summarized as follows.

A Measurement Method 1: A Method for Measuring a Thickness of the Diaphragm

For the measurement of uniform coating: a thickness measurement apparatus is Mahr Millimar thickness meter. The thickness meter has a measuring head diameter of 12 mm and a measuring load of 0.75 N. A 100 mm*100 mm sample is taken. The appearance of a sample is flat and uniform without a scrap material, pinholes, warping, oil, scratches and other defects. It was checked whether the display number of the meter is zeroed before thickness measurement. The display number was confirmed to be zero before and after each group of measurement. During thickness measurement, a probe was gently put down to avoid deformation of the sample. A center of 100 mm×100 mm was determined.

A Test Method 2: A Method for Testing Gas Permeability

A test apparatus is an Oken type gas-permeability meter. The battery diaphragm was fixed. 0.05 Mpa of air pressure was exerted on a diaphragm side. Due to micro-pores on the diaphragm, the air pressure gradually decreased. When 100 mL of air passed completely through the diaphragm, the air pressure was equal to atmospheric pressure. Time in s/100 cc for 100 ml of air to pass through the diaphragm at 0.05 MPa of pressure was recorded. The shorter pressure drop time, the better the gas permeability of the diaphragm, and vice versa.

A Measurement Method 3: A Method for Measuring an Adhesive Force of an Electrode Sheet The diaphragm and the electrode sheet were stacked together, and hot-pressed together for 60 s time under the condition of pressure of 3.5 tons and a temperature of 90° C. The diaphragm was cut into 25 mm*200 mm sample strips. An adhesive test was carried out on a universal tensile strength machine, so as to obtain an adhesive force between the diaphragm and the electrode sheet.

A Test Method 4: A Method for Testing a Capacity Retention Rate

A battery refers to a conventional 3 Ah soft-pack battery. A positive electrode sheet is an NCM523 electrode. A negative electrode sheet is a graphite negative. A cycling property test at 25° C.: A charge/discharge cycle test is carried out at 1 C current (500 turns). The capacity retention rate is a ratio of the discharge capacity of a 500 th turn to the discharge capacity of a first turn.

The adhesive mechanism of the adhesive layer in the diaphragm in the present application: polymer particles of polyvinylidene fluoride (PVDF) and acrylic are bonded together with the electrode sheet by generating an adhesive force under the condition of hot pressing. The adhesive layer can enhance the following properties of a battery cell: (1) the battery cell is allowed to become hard and easy to enter a shell; (2) the cycle life of the battery cell is prolonged; and (3) PVDF has good ability to absorb and retain a liquid.

A Test Method 5: A Method for Testing Crystallinity

The infrared spectrum of PVDF/PVDF-HFP was tested by using an infrared spectrometer from Thermo Fisher. Peaks at 750-775 cm$^{-1}$ were integrated to obtain A1. Peaks at 825-852 cm$^{-1}$ were integrated to obtain A2. F(α) is equal to 1.26A1/(1.26A1+A2).

A Test Method 6: A Method for Testing an a-Phase in a Crystalline Phase

The crystallinity of PVDF/PVDF-HFP was tested by using a TA differential scanning calorimeter DSC-Q2000. A temperature was first increased from room temperature to 300° C. to eliminate thermal history at a rate of 5° C./min. The crystallinity percentage (Xc) of all samples can be calculated according to the following equation:

$$X_c = \frac{\Delta H_f}{\Delta H_f^0} \times 100\%$$

$\Delta H_f$ is the heat of melting of a crystallized portion. $\Delta H_f^0$ is the heat of melting of the 100% crystallization, and $\Delta H_f^0$ for PVDF is 104.7 J-g$^{-1}$.

Embodiment 1

(1) Preparation of a slurry: In accordance with a ratio of a solid dry weight of PVDF-HFP (95:5 of a copolymerization ratio of VDF to HFP, Kynar powerflex LBG PWD from Arkema) to a solid dry weight of a binder (Sichuan Meishan Yindile Co., Ltd., LA133), a PVDF powder and the binder equal to 9:1 were added to a certain amount of water to configure a slurry with a solid content of 10%.

(2) Coating step: A PVDF slurry was coated on a diaphragm (the diaphragm with a thickness of 9 μm produced by SEMCORP) by using a roller coating process, and the thickness of a coating was controlled to be 2 μm to obtain a PVDF coated diaphragm. It was found from a test that PVDF-HFP had a crystallinity of 45%. An α-phase in a crystalline phase of PVDF-HFP had a ratio of 55%. The adhesive strength of the diaphragm and a positive electrode sheet was around 6.1 N/m. A value of an increase in gas permeability per unit coating thickness was around 10.2 s/100 ml, with a C value of 0.6. A battery prepared by using the diaphragm had a capacity retention rate of 85% at 500 turns. It was found from the test that the adhesive strength of the diaphragm and a positive electrode sheet was around 8.2 N/m. A value of an increase in gas permeability per unit coating thickness was around 11.9 s/100 ml, with a C value of 0.69. The battery prepared by using the diaphragm had a capacity retention rate of 88% at 500 turns.

Embodiment 2

(1) Preparation of a slurry: PVDF-HFP (95:5 of a copolymerization ratio of VDF to HFP, Kynar powerflex LBG PWD from Arkema) was dissolved sufficiently in a DMAc solvent to form a solution at a concentration of 8%.

(2) Coating step: A PVDF-HFP solution prepared above was coated on a diaphragm (the diaphragm with a thickness of 9 μm produced by SEMCORP) by using a roller coating process. Pores were produced by non-solvent-induced phase separation to obtain an oil-based PVDF-HFP coated diaphragm. A thickness of a coating was controlled to be 2 μm, to obtain a PVDF-HFP coated diaphragm. It was found from a test that PVDF-HFP had a crystallinity of 25%. An α-phase in a crystalline phase of PVDF-HFP had a ratio of 8%. The adhesive strength of the diaphragm and a positive electrode sheet was around 20.5 N/m. A value of an increase in gas permeability per unit coating thickness was around 25.8 s/100 ml, with a C value of 0.79. A battery prepared by using the diaphragm had a capacity retention rate of 90% at 500 turns.

Embodiment 3

PVDF was replaced with PMMA (from Zeon Corporation, Japan) and the rest was the same as in Embodiment 1.

It was found from a test that the adhesive strength of a diaphragm and a positive electrode sheet was around 12.1 N/m. A value of an increase in gas permeability per unit coating thickness was around 12.5 s/100 ml, with a C value of 0.97. A battery prepared by using the diaphragm had a capacity retention rate of 93% at 500 turns.

Embodiment 4

(1) Preparation of a mixed slurry: A slurry with a solid content of 20% was prepared according to 100:40:10 of a ratio of a dry weight of alumina:a dry weight of PVDF-HFP:a dry weight of binder.

(2) A slurry formed by a mixture of alumina prepared above and PVDF was coated on a diaphragm (the diaphragm with a thickness of 9 μm produced by SEMCORP) by using a roller coating process, and the thickness of a coating was controlled to be 2 μm to obtain a coated diaphragm formed by a mixture of ceramic and PVDF-HFP.

It was found from a test that PVDF-HFP has a crystallinity of 45%. An α-phase in a crystalline phase of PVDF-HFP has a ratio of 55%. The adhesive strength of the diaphragm and a positive electrode sheet was around 7.2 N/m. A value of an increase in gas permeability per unit coating thickness was around 12.3 s/100 ml, with a C value of 0.59. A battery prepared by using the diaphragm had a capacity retention rate of 85% at 500 turns.

Embodiment 5

(1) Preparation of a slurry: A ceramic slurry with a solid content of about 30% was prepared in accordance with 100:5 of a ratio of alumina (produced by Shandong Sinocera Functional Material Co., Ltd., SAO-035EQ) to a binder (BM-900B from Zeon Corporation, Japan).

(2) An alumina slurry prepared above was coated on a diaphragm (the diaphragm with a thickness of 9 μm produced by SEMCORP) by using a roller coating process, and the thickness of a coating was controlled to be 1 micrometer to obtain a ceramic coated diaphragm.

(3) In accordance with 9:1 of a ratio of a solid dry weight of PVDF-HFP to a solid dry weight of a binder, a PVDF-HFP powder (monomers are VDF and HFP, where a copolymerization ratio of VDF to HFP is 95:5) and a binder (LA133 from Sichuan Meishan Yindile Co., Ltd.) were added to a certain amount of water and prepared into a slurry with a solid content of 10%.

(4) Coating step: A PVDF-HFP slurry prepared above was coated on a ceramic coated diaphragm obtained in step (2) using a roller coating process. A thickness of a coating was controlled to be 1 micrometer to obtain a PVDF-HFP coated diaphragm. It was found from a test that PVDF-HFP has a crystallinity of 45%. An α-phase in a crystalline phase of PVDF-HFP has a ratio of 55%. The adhesive strength of the diaphragm and a positive electrode sheet was around 6.4 N/m. A value of an increase in gas permeability per unit coating thickness was around 11.4 s/100 ml, with a C value of 0.56. A battery prepared by using the diaphragm had a capacity retention rate of 83% at 500 turns.

Embodiment 6

The rest was the same as Embodiment 5 except that alumina was replaced with magnesium hydroxide. It was found from a test that PVDF-HFP has a crystallinity of 45%.

An α-phase in a crystalline phase of PVDF-HFP has a ratio of 55%. The adhesive strength of a diaphragm and a positive electrode sheet was around 6.5 N/m. A value of an increase in gas permeability per unit coating thickness was around 11.8 s/100 ml, with a C value of 0.55. A battery prepared by using the diaphragm had a capacity retention rate of 82% at 500 turns.

Embodiment 7

The rest was the same as Embodiment 6 except that alumina was replaced with barium titanate. It was found from a test that PVDF-HFP has a crystallinity of 45%. An α-phase in a crystalline phase of PVDF-HFP has a ratio of 55%. The adhesive strength of a diaphragm and a positive electrode sheet was around 6.3 N/m. A value of an increase in gas permeability per unit coating thickness was around 11.5 s/100 ml, with a C value of 0.55. A battery prepared by using the diaphragm had a capacity retention rate of 82% at 500 turns.

Embodiment 8

(1) Preparation of a slurry: Aramid was dissolved in a DMAc solvent and prepared into an aramid solution with a certain solid content. Barium sulfate was dispersed in DMAc and prepared into a dispersion liquid with a certain solid content. According to 4:6 of a ratio of a solid content of aramid (TEIJIN LIMITED, meta-1313 aramid) to a solid content of barium sulfate, a total solid content of 20% of a mixed dispersion liquid of aramid and barium sulfate was prepared.

(2) The above prepared mixed slurry was coated on a diaphragm (the diaphragm with a thickness of 9 μm produced by SEMCORP) by using a roller coating process. Pores were produced with a solidification bath method. A thickness of a coating was controlled to be 1 μm, so as to obtain a porous coated diaphragm formed by a mixture of aramid and barium sulfate.

(3) In accordance with 9:1 of a ratio of a solid dry weight of PVDF-HFP to a solid dry weight of a binder, a PVDF-HFP powder (monomers are VDF and HFP. A copolymerization ratio of VDF to HFP is 95:5) and a binder (LA133 from Sichuan Meishan Yindile Co., Ltd.) were added to a certain amount of water and prepared into a slurry with a solid content of 10%.

(4) Coating step: A PVDF-HFP slurry prepared above was coated on a ceramic coated diaphragm obtained in step 2) by using a roller coating process. A thickness of a coating was controlled to be 1 micrometer to obtain a PVDF-HFP coated diaphragm. It was found from a test that PVDF-HFP has a crystallinity of 25%. An α-phase in a crystalline phase of PVDF-HFP has a ratio of 8%. The adhesive strength of a diaphragm and a positive electrode sheet was around 6.5 N/m. A value of an increase in gas permeability per unit coating thickness was around 11.2 s/100 ml, with a C value of 0.58. A battery prepared by using the diaphragm had a capacity retention rate of 84% at 500 turns.

Comparative Example 1

The rest was the same as Embodiment 1 except that PVDF was replaced with polystyrene particles (homemade in a laboratory. D50 particle size of around 0.8 μm). It was found from a test that the adhesive strength of a diaphragm and a positive electrode sheet was around 2.1 N/m. A value of an increase in gas permeability per unit coating thickness was around 10.3s/100 ml, with a C value of 0.2. A battery prepared by using the diaphragm had a capacity retention rate of 60% at 500 turns.

Comparative Example 2

The rest was the same as Embodiment 1 except that PVDF was replaced with copolymerized PVDF-HFP (from Sinochem Lantian Co., Ltd., with 45% of VDF) having a high HFP content. It was found from the test that PVDF-HFP has a crystallinity of 33%. An α-phase in a crystalline phase of PVDF-HFP has a ratio of 25%. The adhesive strength of a diaphragm and a positive electrode sheet was around 2.8 N/m. A value of an increase in gas permeability per unit coating thickness was around 11.2 s/100 ml, with a C value of 0.25. A battery prepared by using the diaphragm had a capacity retention rate of 65% at 500 turns.

Comparative Example 3

The rest was the same as Embodiment 2 except that PVDF-HFP in Comparative Example 2 was replaced with homopolymerized PVDF (from Sinochem Lantian Co., Ltd., with 100% of VDF). It was found from a test that homopolymerized PVDF has a crystallinity of 65%, An α-phase in a crystalline phase of PVDF-HFP has a ratio of 76%. The adhesive strength of a diaphragm and a positive electrode sheet was around 2.5 N/m. A value of an increase in gas permeability per unit coating thickness was around 10.2 s/100 ml, with a C value of 0.245. A battery prepared by using the diaphragm had a capacity retention rate of 63% at 500 turns.

Comparative Example 4

The rest was the same as Embodiment 6 except that PVDF was replaced with polystyrene particles (homemade in a laboratory. D50 particle size of around 0.8 μm). It was found from a test that the adhesive strength of a diaphragm and a positive electrode sheet was around 1.2 N/m. A value of an increase in gas permeability per unit coating thickness was around 10.4 s/100 ml, with a C value of 0.12. A battery prepared by using the diaphragm had a capacity retention rate of 51% at 500 turns.

Comparative Example 5

The rest was the same as Embodiment 9 except that PVDF was replaced with polystyrene particles (homemade in a laboratory. D50 particle size of around 0.8 μm). It was found from a test that the adhesive strength of a diaphragm and a positive electrode sheet was around 1.5 N/m. A value of an increase in gas permeability per unit coating thickness was around 11.5 s/100 ml, with a C value of 0.13. A battery prepared by using the diaphragm had a capacity retention rate of 52% at 500 turns.

Comparative Example 6

A diaphragm was a base film in Embodiment 1 (the diaphragm with a thickness of 9 μm produced by SEMCORP). A battery prepared by using the diaphragm had a capacity retention rate of 45% at 500 turns.

Comparative Example 7

A diaphragm was produced with steps being the same as steps (1) and (2) in Embodiment 6 without steps (3) and (4). A battery prepared by using the diaphragm had a capacity retention rate of 46% at 500 turns.

TABLE I

| Embodiments | Structures | A thickness of an adhesive layer (μm) | A heat-resistant layer material | An adhesive layer material | A ratio of VDF to PVDF | A ratio of α-phase to crystallinity of PVDF | Adhesive strength (N/m) | A value (s/100 ml) of an increase in gas permeability per unit coating thickness | Coating coefficient C | Capacity retention rate at 1 C (500 turns) |
|---|---|---|---|---|---|---|---|---|---|---|
| Embodiment 1 | Porous substrate + adhesive layer | 2 | / | PVDF-HFP | 95% | 55% | 8.2 | 11.9 | 0.69 | 88% |
| Embodiment 2 | Porous substrate + adhesive layer | 2 | / | PVDF-HFP Oil-based | 95% | 8% | 20.5 | 25.8 | 0.79 | 90% |
| Embodiment 3 | Porous substrate + adhesive layer | 2 | / | PMMA | | | 12.1 | 12.5 | 0.97 | 93% |
| Embodiment 4 | Porous substrate + adhesive layer | 2 | / | PVDF-HFP + Aluminum Oxide | 95% | 55% | 7.2 | 12.3 | 0.59 | 85% |
| Embodiment 5 | Porous substrate + heat-resistant layer + adhesive layer | 1 | Alumina | PVDF-HFP | 95% | | 6.4 | 11.4 | 0.56 | 83% |

TABLE I-continued

Structures and physical properties of diaphragms in embodiments and the comparative examples

| Embodiments | Structures | A thickness of an adhesive layer (μm) | A heat-resistant layer material | An adhesive layer material | A ratio of VDF to PVDF | A ratio of α-phase to crystallinity of PVDF | Adhesive strength (N/m) | A value (s/100 ml) of an increase in gas permeability per unit coating thickness | Coating coefficient C | Capacity retention rate at 1 C (500 turns) |
|---|---|---|---|---|---|---|---|---|---|---|
| Embodiment 6 | Porous substrate + heat-resistant layer + adhesive layer | 1 | Magnesium hydroxide | PVDF-HFP | 95% | | 6.5 | 11.8 | 0.55 | 82% |
| Embodiment 7 | Porous substrate + heat-resistant layer + adhesive layer | 1 | Barium titanate | PVDF-HFP | 95% | | 6.3 | 11.5 | 0.55 | 82% |
| Embodiment 8 | Porous substrate + heat-resistant layer + adhesive layer | 1 | Aramid + barium sulfate | PVDF-HFP | 95% | | 6.5 | 11.2 | 0.58 | 84% |
| Comparative Example 1 | Porous substrate + adhesive layer | 2 | / | PS | | | 2.1 | 10.3 | 0.20 | 60% |
| Comparative Example 2 | Porous substrate + adhesive layer | 2 | / | PVDF-HFP | 45% | 25% | 2.8 | 11.2 | 0.25 | 65% |
| Comparative Example 3 | Porous substrate + adhesive layer | 2 | / | PVDF | 100% | 76% | 2.5 | 10.2 | 0.245 | 63% |
| Comparative Example 4 | Porous substrate + heat-resistant layer + adhesive layer | 1 | Alumina | PS | / | / | 1.2 | 10.4 | 0.12 | 51% |
| Comparative Example 5 | Porous substrate + heat-resistant layer + adhesive layer | 1 | Aramid + barium sulfate | PS | / | / | 1.5 | 11.5 | 0.13 | 52% |
| Comparative Example 6 | Porous substrate | / | / | / | / | / | 0 | / | / | 45% |
| Comparative Example 7 | Porous substrate + heat-resistant layer | / | Porous substrate + heat resistant layer | / | / | / | 0 | / | / | 46% |

The results of the above experiments are organized as shown in Table I. It can be found from the comparison of the embodiments and the comparative examples that coating PVDF, PMMA and other materials on the surface of the diaphragm can ensure a more excellent adhesive strength of the diaphragm, which prolongs the cycle life (the capacity retention rate) of the lithium battery. The adhesive property of the diaphragm is even better for an oil-based coating such as in Embodiment 3. In this case, a value of the coating coefficient C is used to express a ratio of the adhesive property to the value of the increase in the gas permeability, and limit the ratio to a certain range, so as to fully guarantee the adhesive property and the gas permeability of the diaphragm. When the diaphragm does not have the adhesive layer, after 500 turns of charging and discharging cycles, the capacity retention rate is less than 80%; the capacity retention rate is smaller, and the cycle life is shorter. When the value of the coating coefficient C is in a range of 0.3 to 1, the capacity retention rate is greater than 80%, and the cycle life is longer.

In summary, to improve the adhesive property and the gas permeability of a battery diaphragm today, the present application proposes a method for enhancing a property of adhesion between a diaphragm and an electrode sheet by introducing polymer particles into a diaphragm coating. In addition, a heat-resistant polymer material such as aramid is introduced into the diaphragm coating, which increases a diaphragm-breaking temperature of the diaphragm. Further, ceramic is introduced into the diaphragm coating to improve the heat shrinkage resistance of the diaphragm. The above improvement means not only can effectively solve the problem that the ceramic coating is prone to peeling off from the diaphragm due to insufficient adhesive strength, but also can ensure the gas permeability of the diaphragm. In addition, for the present application, the value of the coating coefficient C is designed to indicate the adhesive property and the gas permeability of the coating and limit the value to a certain better range, which can be very convenient to evaluate and ensure that the adhesive property and the gas permeability of the diaphragm meet requirements.

The terms "in some embodiments" and "in various embodiments" are used repeatedly. These terms do not usually refer to the same embodiments but may refer to the same embodiments. The terms "comprising," "having," and "including" are synonymous unless the context indicates otherwise.

The above is only an embodiment of the present application, and is not a limitation of the present application in any form. Although the present application is disclosed as described above in a specific embodiment, the preferred embodiment is not used to limit the present application. Some changes or modifications may be made into the equivalent embodiments of equivalent changes by utilizing the technical content disclosed in the above by a person skilled in the art without departing from the scope of the technical solution of the present application. However, any simple amendment, equivalent change or modification of the above embodiment made based on the technical substance of the present application without departing from the content of the technical solution of the present application still falls into the scope of the technical solution of the present application.

What is claimed is:

1. A battery diaphragm, comprising:
a porous substrate; and
an adhesive layer formed on a side of the porous substrate, wherein the adhesive layer comprises a polymer material with an adhesive property, the polymer material comprises vinylidene fluoride (VDF) polymer, a raw material of the vinylidene fluoride polymer has a crystallinity in a range between 10% and 50%, the adhesive layer has a coating coefficient C, the coating coefficient C is equal to a ratio of an adhesive strength A of the adhesive layer to a value P of an increase in gas permeability per unit coating thickness of the adhesive layer, a relation C=A/P is satisfied, the coating coefficient C has a ratio in a range of 0.4<C<0.9, the adhesive strength A of the adhesive layer has a unit of N/m, the value P of the increase in the gas permeability per unit coating thickness of the adhesive layer has a unit of s/100 cc/μm, the adhesive layer is formed by coating aqueous vinylidene fluoride polymer, an α-phase in a crystalline region of the aqueous vinylidene fluoride polymer has a ratio greater than 30% and less than 70%, and the adhesive strength A of the adhesive layer is an adhesive force between the battery diaphragm and an electrode sheet.

18

2. A battery diaphragm, comprising:
a porous substrate; and
an adhesive layer formed on a side of the porous substrate, wherein the adhesive layer comprises a polymer material with an adhesive property, the polymer material comprises vinylidene fluoride (VDF) polymer, a raw material of the vinylidene fluoride polymer has a crystallinity in a range between 10% and 50%, the adhesive layer has a coating coefficient C, the coating coefficient C is equal to a ratio of an adhesive strength A of the adhesive layer to a value P of an increase in gas permeability per unit coating thickness of the adhesive layer, a relationship C-A/P is satisfied, the coating coefficient C has a ratio in a range of 0.4<C<0.9, the adhesive strength A of the adhesive layer has a unit of N/m, and the value P of the increase in the gas permeability per unit coating thickness of the adhesive layer has a unit of s/100 cc/μm, the adhesive layer is formed by coating oil-based vinylidene fluoride polymer, an α-phase in a crystalline region of the oil-based vinylidene fluoride polymer has a ratio less than 20%, and the adhesive strength A of the adhesive layer is an adhesive force between the battery diaphragm and an electrode sheet.

3. A lithium battery, comprising: a positive electrode, a negative electrode and the battery diaphragm according to claim 1, wherein the battery diaphragm is positioned between the positive electrode and the negative electrode.

4. A lithium battery, comprising: a positive electrode, a negative electrode and the battery diaphragm according to claim 2, wherein the battery diaphragm is positioned between the positive electrode and the negative electrode.

5. The battery diaphragm according to claim 1, wherein the vinylidene fluoride (VDF) polymer comprises a polyvinylidene fluoride homopolymer or a polyvinylidene fluoride copolymer.

6. The battery diaphragm according to claim 1, wherein the adhesive layer further comprises a filler.

7. The battery diaphragm according to claim 1, wherein the increase in the gas permeability per unit coating thickness of the adhesive layer is in a range between 11.4 s/100 cc/μm and 12.5 s/100 cc/μm.

8. The battery diaphragm according to claim 1, wherein the adhesive strength A of the adhesive layer is in a range between 6.3 N/m and 12.1 N/m.

9. The battery diaphragm according to claim 1, wherein the increase in the gas permeability per unit coating thickness of the adhesive layer is in a range between 11.4 s/100 cc/μm and 12.5 s/100 cc/μm and the adhesive strength A of the adhesive layer is in a range between 6.3 N/m and 12.1 N/m.

10. The battery diaphragm according to claim 2, wherein the vinylidene fluoride (VDF) polymer comprises a polyvinylidene fluoride homopolymer or a polyvinylidene fluoride copolymer.

11. The battery diaphragm according to claim 2, wherein the adhesive layer further comprises a filler.

12. The battery diaphragm according to claim 2, wherein the increase in the gas permeability per unit coating thickness of the adhesive layer is in a range between 11.2 s/100 cc/μm and 25.8 s/100 cc/μm.

13. The battery diaphragm according to claim 2, wherein the adhesive strength A of the adhesive layer is in a range between 6.5 N/m and 20.5 N/m.

14. The battery diaphragm according to claim 2, wherein the increase in the gas permeability per unit coating thickness of the adhesive layer is in a range between 11.2 s/100 cc/µm and 25.8 s/100 cc/µm and the adhesive strength A of the adhesive layer is in a range between 6.5 N/m and 20.5 N/m.

\* \* \* \* \*